United States Patent
Feuerborn et al.

(10) Patent No.: US 10,989,293 B2
(45) Date of Patent: *Apr. 27, 2021

(54) NON-METAL SPROCKET AND BUSHING APPARATUS

(71) Applicant: ContiTech Antriebssysteme GmbH, Hannover (DE)

(72) Inventors: Frank Feuerborn, Lincoln, NE (US); Jacob Kaplan, Omaha, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,256

(22) Filed: May 30, 2019

(65) Prior Publication Data
US 2019/0277384 A1   Sep. 12, 2019

Related U.S. Application Data

(63) Continuation-in-part of application No. 15/995,937, filed on Jun. 1, 2018, and a continuation-in-part of
(Continued)

(51) Int. Cl.
*F16H 55/06* (2006.01)
*F16H 55/48* (2006.01)
*F16H 55/17* (2006.01)

(52) U.S. Cl.
CPC ........... *F16H 55/06* (2013.01); *F16H 55/171* (2013.01); *F16H 55/48* (2013.01); *F16H 2055/065* (2013.01)

(58) Field of Classification Search
CPC ................................ F16H 55/30; F16H 55/171
(Continued)

(56) References Cited

U.S. PATENT DOCUMENTS

| 22,154 A | * | 11/1858 | Barnard | ............... F16C 33/3706 384/551 |
| 882,753 A | * | 3/1908 | Grant | ............................ 384/588 |

(Continued)

FOREIGN PATENT DOCUMENTS

| CN | 101198809 A | 6/2008 |
| DE | 202014100830 U1 | 4/2014 |

(Continued)

*Primary Examiner* — Henry Y Liu
(74) *Attorney, Agent, or Firm* — David L. Cate; Gregory Adams

(57) ABSTRACT

An apparatus includes a non-metal high torque sprocket and non-metal bushing. The non-metal high torque sprocket includes a body defining an outer periphery and a hub section defining an inner surface for engaging a bushing, a continuous toothed structure disposed on the outer periphery of the body, and a textile reinforcement embedded in the body adjacent the inner surface of the hub section, wherein the body is formed of a castable polymer material. The hub section inner surface is a tapered shape, and is adapted to engage a conventional QD bushing or a taper-lock bushing. The non-metal bushing is engageable by the hub section inner surface of the high torque sprocket. The non-metal bushing may be formed of a castable polymer material, which may optionally include ultra-high molecular weight powder. According to some embodiments, the non-metal bushing is a QD bushing.

16 Claims, 6 Drawing Sheets

Related U.S. Application Data application No. 15/177,497, filed on Jun. 9, 2016, now abandoned.

(58) Field of Classification Search
USPC .................................................. 474/165, 161
See application file for complete search history.

(56) References Cited

U.S. PATENT DOCUMENTS

| | | | | |
|---|---|---|---|---|
| 1,903,776 A * | 4/1933 | Clark | ................... | F16C 35/077 |
| | | | | 29/892 |
| 1,953,362 A * | 4/1934 | Murtaugh | ............ | B62D 55/135 |
| | | | | 474/164 |
| 2,269,821 A * | 1/1942 | Kemphert | ............. | F16D 1/0864 |
| | | | | 474/170 |
| 2,691,541 A | 10/1954 | Benedek | | |
| 2,704,793 A * | 3/1955 | Hanson | ................ | C25D 7/0657 |
| | | | | 191/1 A |
| 2,710,762 A * | 6/1955 | Whitaker | ................ | F16D 1/096 |
| | | | | 403/16 |
| 2,720,119 A * | 10/1955 | Sherman | ................ | F16H 55/16 |
| | | | | 74/460 |
| 2,784,606 A * | 3/1957 | Schilling | ................ | F16H 55/42 |
| | | | | 474/169 |
| 2,839,943 A * | 6/1958 | Hausmann | ................ | F16H 55/06 |
| | | | | 74/445 |
| 2,890,071 A | 6/1959 | Johnson | | |
| 2,938,757 A * | 5/1960 | Pieper | ..................... | F16B 39/28 |
| | | | | 384/547 |
| 2,986,416 A | 5/1961 | Firth | | |
| 3,083,583 A | 4/1963 | Reinhold | | |
| 3,117,460 A | 1/1964 | Traeger | | |
| 3,180,171 A * | 4/1965 | Arpin | ..................... | F16H 55/06 |
| | | | | 74/460 |
| 3,226,995 A * | 1/1966 | Getz | ....................... | F16H 55/56 |
| | | | | 474/20 |
| 3,241,391 A * | 3/1966 | Borro, Sr. | ................ | B29C 45/14 |
| | | | | 74/445 |
| 3,367,199 A * | 2/1968 | Dankowski | ............ | F16H 55/42 |
| | | | | 474/199 |
| 3,596,943 A * | 8/1971 | Krauss | ..................... | F16D 1/09 |
| | | | | 403/370 |
| 3,638,974 A * | 2/1972 | Stratienko | ............... | F16D 1/094 |
| | | | | 403/12 |
| 3,651,705 A * | 3/1972 | Bertinetti | ................ | F16H 55/06 |
| | | | | 474/161 |
| 3,738,691 A * | 6/1973 | Firth | ....................... | F16D 1/096 |
| | | | | 403/370 |
| 3,744,330 A | 6/1973 | Sugimoto | | |
| 3,756,091 A | 9/1973 | Miller et al. | | |
| 3,870,379 A * | 3/1975 | Payne | ..................... | B62D 55/24 |
| | | | | 305/181 |
| 3,924,481 A | 12/1975 | Gregg | | |
| 3,969,946 A | 7/1976 | Gregg | | |
| 3,975,965 A * | 8/1976 | Speer | ..................... | F16H 7/1281 |
| | | | | 474/135 |
| 3,977,265 A | 8/1976 | Worley et al. | | |
| 4,002,081 A * | 1/1977 | Schultz, Jr. | ............. | F16H 55/48 |
| | | | | 474/94 |
| 4,037,485 A | 7/1977 | Hoback | | |
| 4,041,789 A | 8/1977 | Hoback | | |
| 4,070,920 A | 1/1978 | LeBlanc | | |
| 4,103,558 A * | 8/1978 | Peabody | .................. | B60B 3/08 |
| | | | | 474/197 |
| 4,218,932 A * | 8/1980 | McComber | ............. | F16H 7/023 |
| | | | | 180/9.62 |
| 4,233,852 A | 11/1980 | Bruns | | |
| 4,244,847 A * | 1/1981 | Posiviata | ................. | C08L 9/06 |
| | | | | 524/14 |
| 4,304,502 A * | 12/1981 | Stratienko | ............... | F16D 1/094 |
| | | | | 403/370 |
| 4,337,056 A | 6/1982 | Bruns | | |
| 4,365,964 A * | 12/1982 | Krome, Jr. | ............... | F16H 55/56 |
| | | | | 474/28 |
| 4,366,609 A * | 1/1983 | Speer | .................. | B29C 45/1418 |
| | | | | 264/266 |
| 4,403,979 A | 9/1983 | Wujick | | |
| 4,418,179 A * | 11/1983 | DeWitt | .................. | C08G 61/08 |
| | | | | 525/249 |
| 4,427,403 A | 1/1984 | Kanamori et al. | | |
| 4,468,211 A | 8/1984 | Hoshiro et al. | | |
| 4,514,179 A * | 4/1985 | Skura | ........................ | F16G 1/28 |
| | | | | 474/204 |
| 4,515,577 A | 5/1985 | Cathey et al. | | |
| 4,570,786 A * | 2/1986 | Morrison | ............... | B65G 39/02 |
| | | | | 198/842 |
| 4,586,915 A | 5/1986 | Cathey et al. | | |
| 4,604,080 A | 8/1986 | Mizuno | | |
| 4,605,389 A | 8/1986 | Westhoff | | |
| 4,614,509 A | 9/1986 | Tangorra et al. | | |
| 4,624,597 A | 11/1986 | Johnson et al. | | |
| 4,650,443 A | 3/1987 | Wetzel | | |
| 4,670,508 A * | 6/1987 | Ohdaira | ................. | C08L 101/00 |
| | | | | 524/495 |
| 4,679,999 A | 7/1987 | Wetzel | | |
| 4,696,665 A | 9/1987 | Macchiarulo et al. | | |
| 4,717,370 A * | 1/1988 | Rohrig | .................. | F16F 15/124 |
| | | | | 474/161 |
| 4,722,721 A | 2/1988 | Wetzel | | |
| 4,840,606 A | 6/1989 | Wetzel | | |
| 4,840,608 A | 6/1989 | Araki | | |
| 4,878,886 A | 11/1989 | Kitabayashi et al. | | |
| 4,915,674 A | 4/1990 | Tanaka et al. | | |
| 4,929,221 A | 5/1990 | Tanaka et al. | | |
| 4,950,211 A * | 8/1990 | James | ....................... | F16H 55/30 |
| | | | | 180/9.1 |
| 4,988,231 A * | 1/1991 | Pettit | ......................... | F16B 3/04 |
| | | | | 403/370 |
| 4,991,993 A * | 2/1991 | Watlington | ........... | F16D 1/0864 |
| | | | | 29/402.08 |
| 4,993,998 A | 2/1991 | Tanaka et al. | | |
| 5,015,218 A | 5/1991 | Macchiarulo et al. | | |
| 5,026,327 A | 6/1991 | White, Jr. et al. | | |
| 5,046,993 A | 9/1991 | Macchiarulo et al. | | |
| 5,059,464 A * | 10/1991 | Mikuni | ................... | B29D 15/00 |
| | | | | 428/66.7 |
| 5,074,828 A * | 12/1991 | Ellis | ........................ | F16H 55/06 |
| | | | | 474/161 |
| 5,098,346 A * | 3/1992 | Redmond | ............. | F16H 55/171 |
| | | | | 474/161 |
| 5,131,731 A * | 7/1992 | Johnson | ............... | B62D 55/125 |
| | | | | 305/193 |
| 5,145,188 A | 9/1992 | Bartelt et al. | | |
| 5,201,635 A * | 4/1993 | Steinmetz | ........... | B01F 7/00016 |
| | | | | 366/316 |
| RE34,485 E | 12/1993 | Tanaka et al. | | |
| 5,292,584 A * | 3/1994 | Howard | ................... | A61L 27/44 |
| | | | | 428/327 |
| 5,304,101 A * | 4/1994 | Baer | ........................ | F16D 1/096 |
| | | | | 474/170 |
| 5,435,784 A * | 7/1995 | Mark | ........................ | F16D 1/096 |
| | | | | 464/182 |
| 5,441,458 A * | 8/1995 | Rogus | .................... | F16H 7/1245 |
| | | | | 198/826 |
| 5,833,562 A | 11/1998 | Walker, Sr. | | |
| 5,852,951 A * | 12/1998 | Santi | ....................... | F16H 55/06 |
| | | | | 74/443 |
| 5,908,591 A * | 6/1999 | Lewit | .................. | B29C 44/1209 |
| | | | | 156/182 |
| 5,931,755 A * | 8/1999 | Mailey | ................ | B29C 45/0005 |
| | | | | 474/161 |
| 5,934,447 A * | 8/1999 | Kanaris | ................... | B65G 23/06 |
| | | | | 198/834 |
| 5,961,412 A * | 10/1999 | Takahashi | ................ | F16G 5/20 |
| | | | | 428/222 |
| 6,176,797 B1 * | 1/2001 | Vine | ....................... | F16D 1/094 |
| | | | | 474/170 |
| 6,254,371 B1 * | 7/2001 | McNally | ................ | B29C 33/22 |
| | | | | 425/214 |

(56) References Cited

U.S. PATENT DOCUMENTS

| | | | |
|---|---|---|---|
| 6,485,384 B1 | 11/2002 | Ochiai et al. | |
| 6,591,708 B2* | 7/2003 | Kobayashi | B29C 70/345 264/257 |
| 6,599,053 B1* | 7/2003 | Judson | F16D 1/096 403/368 |
| 6,767,491 B2* | 7/2004 | Kurokawa | B29C 43/027 264/138 |
| 6,976,921 B2* | 12/2005 | Mehlan | F16D 3/76 464/75 |
| 7,698,964 B2* | 4/2010 | Kashimura | F16H 55/16 74/461 |
| 7,814,809 B2* | 10/2010 | Shinohara | F16H 55/06 74/443 |
| 7,887,446 B2 | 2/2011 | Hironaka | |
| 7,967,709 B2* | 6/2011 | Emura | B62M 9/105 474/161 |
| 8,070,634 B2 | 12/2011 | Gaynor | |
| 8,312,959 B1 | 11/2012 | Schneider et al. | |
| 8,822,753 B2 | 9/2014 | Kawakami | |
| 9,360,099 B2* | 6/2016 | Wang | F16H 55/49 |
| 9,670,985 B2 | 6/2017 | Sekiguchi et al. | |
| 9,950,768 B2 | 4/2018 | Osaki et al. | |
| 10,161,487 B2 | 12/2018 | Pease et al. | |
| 10,436,286 B2 | 10/2019 | Matsukawa | |
| 10,865,868 B2 | 12/2020 | Feuerborn et al. | |
| 2002/0043124 A1* | 4/2002 | Shiga | B29D 15/00 74/434 |
| 2003/0195072 A1* | 10/2003 | Redmond | F16H 55/30 474/161 |
| 2005/0020392 A1 | 1/2005 | Redmond | |
| 2006/0254548 A1* | 11/2006 | Dec | F01L 1/02 123/90.31 |
| 2006/0264286 A1* | 11/2006 | Hodjat | F16H 55/171 474/152 |
| 2007/0021558 A1* | 1/2007 | Shinohara | C08L 77/06 525/66 |
| 2007/0202332 A1* | 8/2007 | Gunnewig | C08L 59/00 428/402 |
| 2008/0014602 A1* | 1/2008 | Nagano | C09B 11/08 435/18 |
| 2008/0146402 A1* | 6/2008 | Shinohara | F16H 55/06 475/331 |
| 2010/0081530 A1* | 4/2010 | Crump | B21K 1/30 474/152 |
| 2011/0250070 A1* | 10/2011 | Demtroder | B23P 11/025 416/170 R |
| 2013/0260624 A1* | 10/2013 | Rastogi | C08F 4/52 442/1 |
| 2014/0023817 A1* | 1/2014 | Kaushik | C08L 27/12 428/66.1 |
| 2014/0102387 A1* | 4/2014 | Taylor | F01L 1/3442 123/90.15 |
| 2014/0227548 A1* | 8/2014 | Myrick | C10L 1/28 428/570 |
| 2014/0243466 A1* | 8/2014 | Sinha | C08L 71/08 524/508 |
| 2015/0211623 A1* | 7/2015 | Inui | B23K 15/04 474/152 |
| 2015/0219203 A1* | 8/2015 | Pflug | F16H 7/023 474/91 |
| 2016/0016368 A1* | 1/2016 | Kunishima | F16H 55/06 74/434 |
| 2016/0090453 A1* | 3/2016 | Mathur | B32B 27/32 264/175 |
| 2016/0153541 A1* | 6/2016 | Fuchs | F16H 55/14 474/161 |
| 2016/0363206 A1* | 12/2016 | Modrzejewski | F16H 55/06 |
| 2017/0226242 A1* | 8/2017 | Smeets | C08F 4/6567 |
| 2017/0356540 A1 | 12/2017 | Feuerborn et al. | |
| 2018/0274648 A1 | 9/2018 | Feuerborn et al. | |
| 2019/0277384 A1 | 9/2019 | Feuerborn et al. | |
| 2020/0056692 A1 | 2/2020 | Feuerborn et al. | |

FOREIGN PATENT DOCUMENTS

| | | |
|---|---|---|
| DE | 112013003955 T5 | 4/2015 |
| EP | 0106694 A1 | 4/1984 |
| EP | 1176083 A1 | 1/2002 |
| EP | 1884540 A1 | 2/2008 |
| EP | 3015257 A1 | 5/2016 |
| JP | H07180747 A | 7/1995 |
| JP | 2000320626 A | 11/2000 |
| JP | 2001065648 A | 3/2001 |
| JP | 2002039329 A | 2/2002 |
| JP | 2006153249 A | 6/2006 |
| JP | 2014141048 A | 8/2014 |
| JP | 2015502285 A | 1/2015 |
| KR | 20060039006 A | 5/2006 |
| WO | 2013070404 A2 | 5/2013 |
| WO | 2014024377 A1 | 2/2014 |
| WO | 2015029840 A1 | 3/2015 |

* cited by examiner

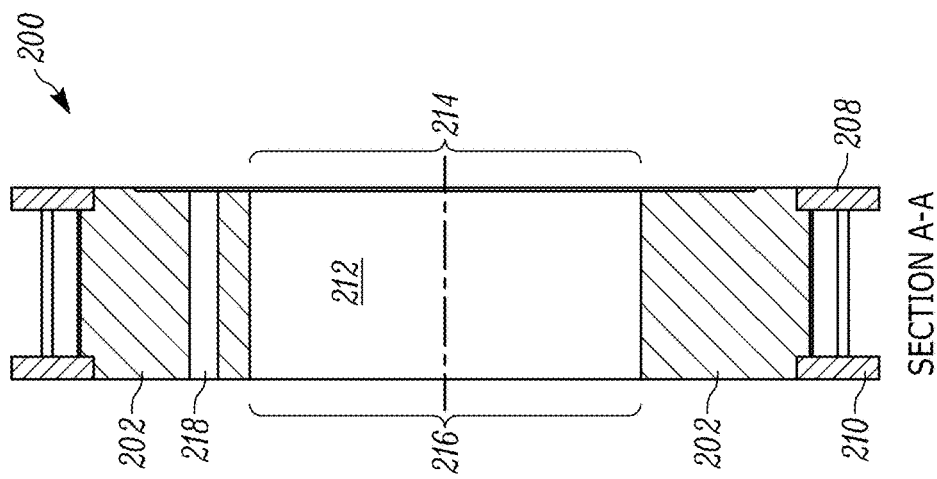
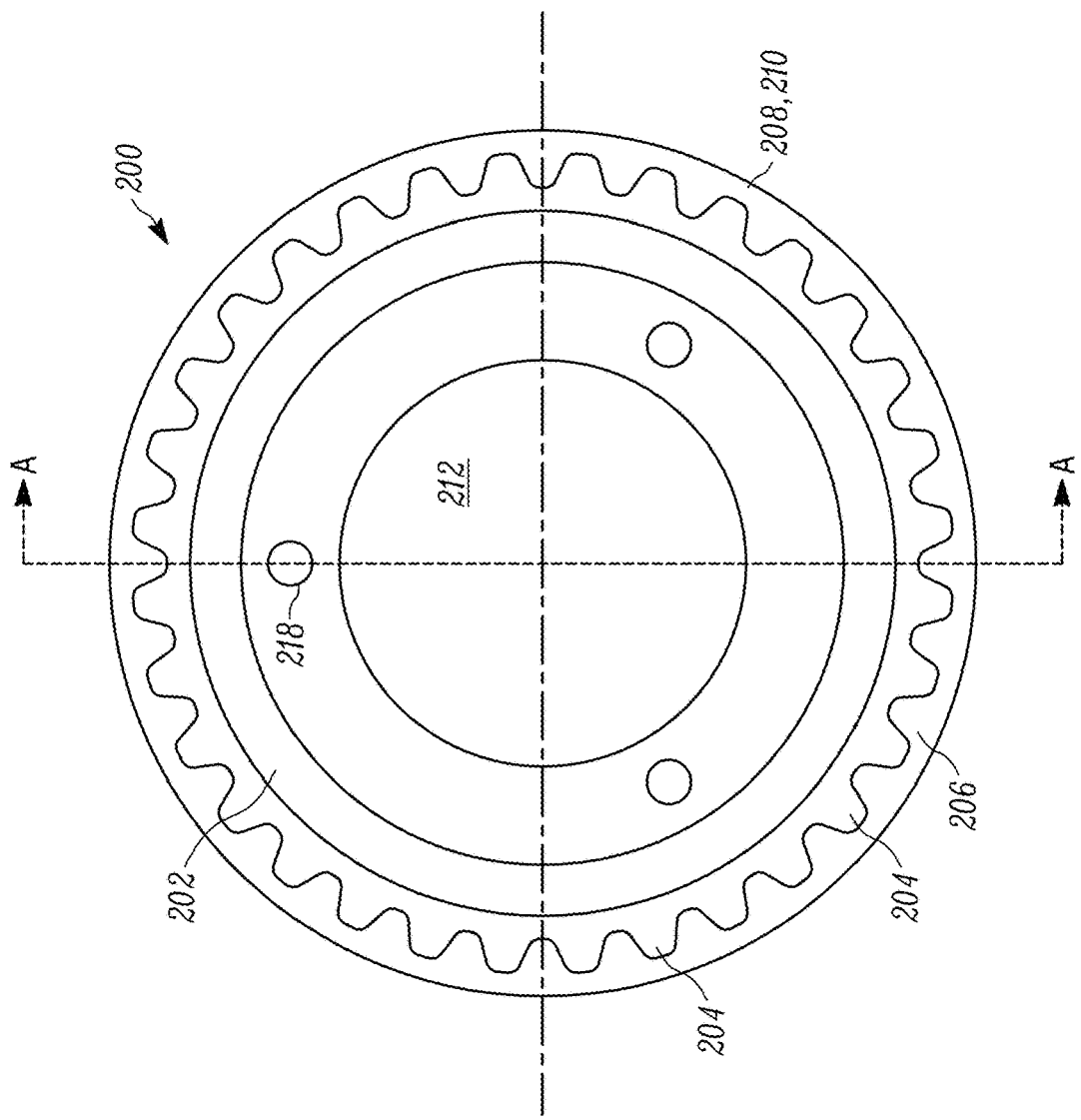
FIG. 2B
FIG. 2A

NON-METAL SPROCKET AND BUSHING APPARATUS

RELATED APPLICATION INFORMATION

This patent application is a continuation in part of, and claims priority to, U.S. Non-provisional patent application Ser. No. 16/307,950, filed Dec. 7, 2018, which is a National State entry from PCT Application No. PCT/EP2017/062294, filed May 22, 2017, which claims priority to U.S. Non-provisional patent application Ser. No. 15/177,497 filed Jun. 9, 2016, now abandoned. This patent application is also a continuation in part of, and claims priority to, U.S. Non-provisional patent application Ser. No. 15/995,937 filed Jun. 1, 2018. The above mentioned disclosures are all incorporated herein in their entirety, by reference thereto.

FIELD

The field to which the disclosure generally relates is belt sprockets, and bushings used to secure the sprockets, and more particularly to belt sprockets and bushings formed from polymeric materials.

BACKGROUND

This section provides background information to facilitate a better understanding of the various aspects of the disclosure. It should be understood that the statements in this section of this document are to be read in this light, and not as admissions of prior art.

Sprockets typically include a plurality of teeth that are arranged in alternating fashion with groves. The teeth and grooves extend about an entire outer circumference of the sprocket. A toothed belt engages the toothed surface. Conventional sprockets for high torque applications are made of iron or steel. Often the sprocket is affixed onto a shaft with a bushing. The use of a bushing allows a sprocket to be installed on many different shaft sizes. Two common types of bushings are quick disconnect (QD) and Taper-Lock. Both of these bushing types use a tapered interface between the sprocket hub and bushing which generates large hub forces in the sprocket in order to clamp onto the shaft.

Synchronous belts and pulleys are commonly offered in standard pitch sizes of 5, 8, 14, and 20 mm. There are some offerings of non-metal pulleys in the 5 and 8 mm pitch sizes. These are typically made of nylon molded to an aluminum or steel hub with a straight bore and set screw for attaching to a shaft. However, such pulleys are not adequately durable for high torque applications, many of which require the larger pitch sizes. Also, in some cases, synchronous pulleys made of other materials than steel can have wear issues and have the teeth erode, wear out and fail.

Metal bushings, when used to secure non-metal sprockets to a drive or driven shaft, may often have a higher of mass than desired. Such high mass can present safe handling and installation issues, and heavy shipping weight, as well as undesired increased drive inertia and energy requirement due to the high mass.

Thus, there is an ongoing need for durable non-metal pulleys or sprockets, for high torque applications, and bushings for securing these pulleys or sprockets, such needs met, at least in part, with embodiments according to the following disclosure.

SUMMARY

This section provides a general summary of the disclosure, and is not a necessarily a comprehensive disclosure of its full scope or all of its features.

In a first aspect of the disclosure an apparatus includes a non-metal high torque sprocket and non-metal bushing. The non-metal high torque sprocket includes a body defining an outer periphery and a hub section defining an inner surface for engaging a bushing, a continuous toothed structure disposed on the outer periphery of the body, and a textile reinforcement embedded in the body adjacent the inner surface of the hub section, wherein the body is formed of a castable polymer material. The hub section inner surface is a tapered shape, and is adapted to engage a conventional QD bushing or a taper-lock bushing. The non-metal bushing is engageable by the hub section inner surface of the high torque sprocket.

In some aspects of the disclosure, the non-metal bushing is formed of a castable polymer material. The non-metal bushing may even be formed of a castable polymer material including ultra-high molecular weight powder. According to some embodiments, the non-metal bushing is a QD bushing.

In some aspects, the high torque sprockets further include a textile reinforcement embedded in the continuous toothed structure outer surface, and the textile reinforcement is selected from nylon, carbon cordage, cotton, aramid, PTFE, and mixtures thereof.

In some aspects, the high torque sprockets have a castable polymer material body devoid of any metal structure, and may further define ports which could have threaded metal inserts placed therein. In some embodiments, the continuous toothed structure is formed of steel or the castable polymer material.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIGS. 2A and 2B together depict in an isometric view, other aspects of some high torque sprockets according to embodiments of the disclosure;

DETAILED DESCRIPTION

Figure 1:
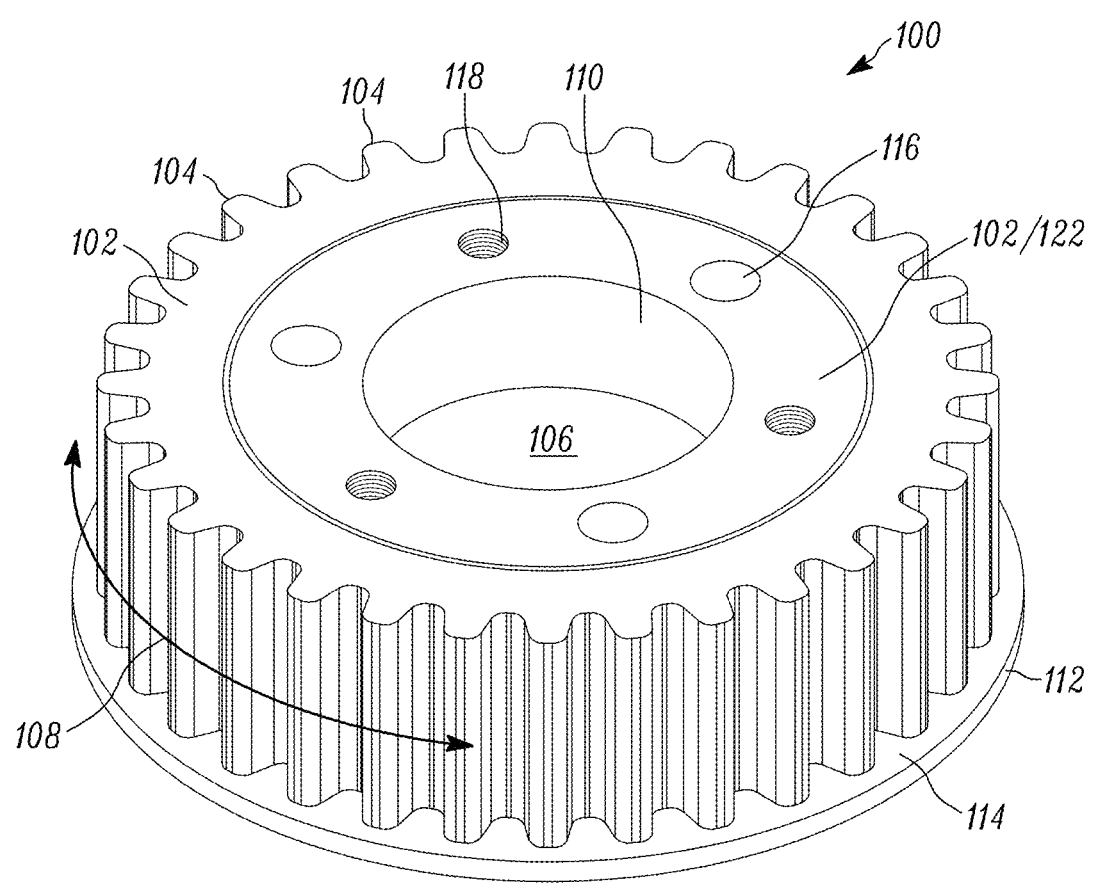
FIG. 1 illustrates a high torque sprocket in a perspective view, according to an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

In some embodiments, a high torque sprocket 100, as depicted in the perspective view presented in FIG. 1, is provided which includes a body 102 defining an outer periphery 104, and a hub section 106 for engaging a bushing. A continuous toothed structure 108 is disposed completely around the outer periphery of the body 102. In some embodiments, a textile reinforcement is embedded in the hub section adjacent inner surface 110. The textile reinforcement may embedded adjacent inner surface 110 at any suitable distance from inner surface 110, so that it may provide effective shape maintaining strength to the overall body 102 from hoop stresses imparted onto body 102 when a bushing is installed into hub section 106.

The body 102 may be formed of a castable polymer material, and in some aspects, may be essentially free or devoid of any metal structure, or structures. In some other aspects, the body 102 is formed of a castable polymer material, and includes a metal hub upon which the castable polymer body 102 is adhered to, cast upon, or otherwise installed upon. In some other embodiments, the body 102 is formed of a castable polymer material essentially free or devoid of any metal structure(s) other than metallic threaded inserts and/or metallic collars installed within ports of the body 102 for retaining an installed bushing; and in such cases, it is within the definition of "essentially free or devoid of any metal structure(s)" when such separate metallic parts are installed into one or more ports, or even partial ports, as described in further detail below.

In some embodiments, the continuous toothed structure 108 disposed around the outer periphery of body 102 is an extension of, or otherwise formed from, the castable material forming body 102. In such cases, the matrix of material forming body 102 and toothed structure 108 is essentially a continuous matrix, and even so in cases where suitable textile reinforcement material(s) are embedded therein. In some alternative embodiments, the continuous toothed structure 108 disposed around the outer periphery of body 102 is formed a different material from the castable material forming body 102, such as a different polymeric material or composite, or even metal, such as steel, aluminum, and the like. Also, optionally, in some embodiments, an outer portion of the body 102 is formed of the castable polymer material and an inner portion of the body is formed of steel, 122, as alternatively illustrated in FIG. 1.

In some aspects, a flange 112 is disposed on a side of the body 102 immediately adjacent the continuous toothed structure 108. Although one flange is shown in the embodiment illustrated in FIG. 1, it is within the scope of the disclosure that sprocket embodiments have zero, one or two flanges. In some embodiments, a textile reinforcement is embedded in the side surface 114 of the flange 112 (or flanges when two are used) immediately adjacent the continuous toothed structure 108. Also, in some embodiments, a textile reinforcement is embedded in the continuous toothed structure 108 outer surface. As further shown in FIG. 1, body 102 may include ports 116, 118 formed therein for such purposes as attachment to other components with suitable fasteners for retaining a bushing, balance, weight optimization, temperature conductivity, and the like.

Now referencing FIGS. 2A and 2B, which depict other aspects of some sprocket embodiments according to the disclosure. Sprocket 200 is shown in FIG. 2A from a side view perspective, and includes body 202. Continuous toothed structure 204 is disposed completely around the outer tooth periphery 206 of the body 202. Optional flanges 208 and 210 extend outwardly from the outer edges of tooth periphery 206, and while two flanges are shown, it is within the scope and spirit of the disclosure to have one flange, such as 208 or 210, or no flange, as well. Body 202 further defines hub section 212, which is essentially an opening for accepting and engaging a bushing. As shown in FIG. 2B, a cross-sectional view of FIG. 2A taken at section A, hub section 212 is a tapered shape where the diameter of opening 214 is greater than the diameter of opening 216. Body 202 may further define ports 218 (three shown, for example, in FIG. 2A) for securing or otherwise retaining the sprocket onto a QD type bushing using a suitable fastener system.

Now turning to FIGS. 3A-3D which show in side, or otherwise edge views, some examples of continuous toothed or grooved patterns useful as engaging structure for some sprockets according to the disclosure. In a first aspect shown in FIG. 3A, a raised tooth pattern, such as that depicted at 108 in FIG. 1, and 206 in FIG. 2, surrounds the outer tooth periphery of body 304, and is positioned between opposing and optional flanges 306 and 308. The tooth pattern depicted may be useful for several applications, including, but not limited to, driving or being driven by a synchronous belt, or any belt with a mating face, as well as use as a synchronous sprocket, gear sprocket, coupling, and the like.

Figure 3A:
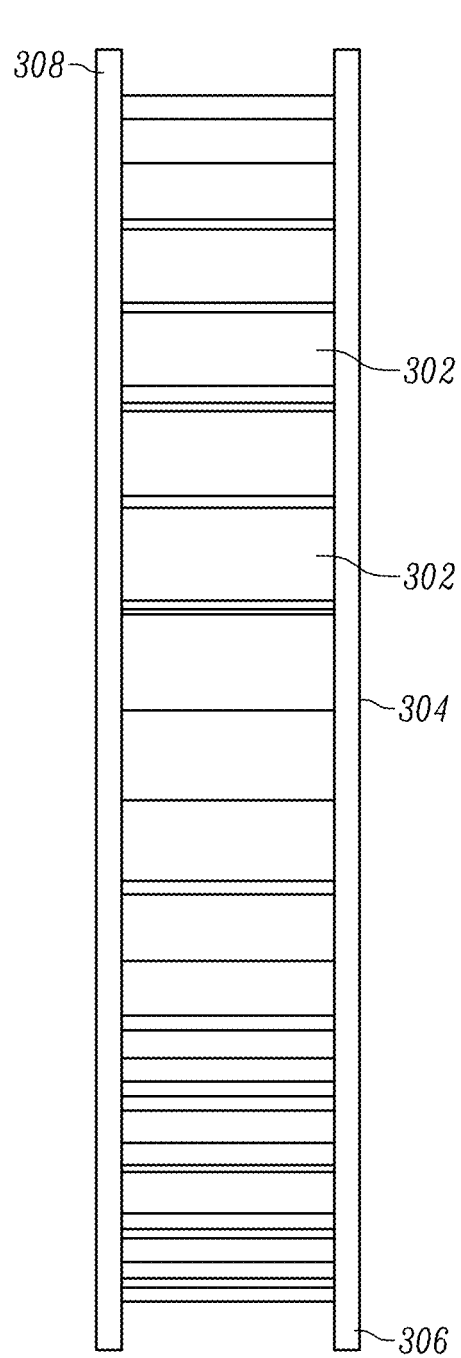
FIGS. 3A-3D show in side views, some examples of continuous toothed or grooved patterns useful in sprockets according to the disclosure.
Figure 3B:
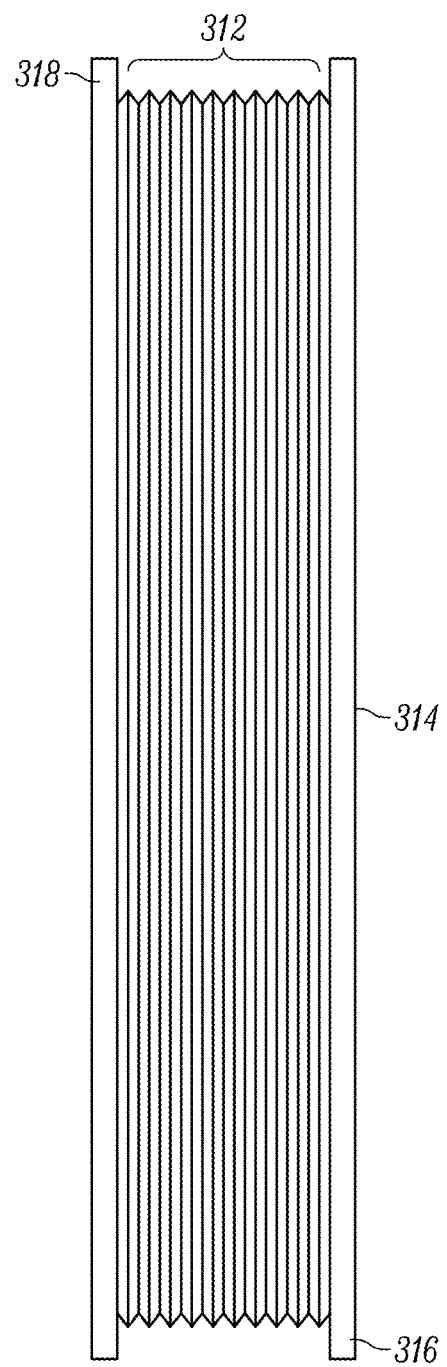

FIG. 3B shows a belt engaging structure 312 continuously disposed on the periphery of body 314, and which is shown positioned between opposing and optional flanges 316 and 318. The belt engaging structure 312 is effective for driving or being driven by a poly-v belt. The belt engaging structure 312 is essentially a series of continuous parallel grooves embossed in the periphery of the body 314. In some aspects, the surface of the belt engaging structure 312 may be embossed with a suitable textile reinforcement material.

Figure 3C:
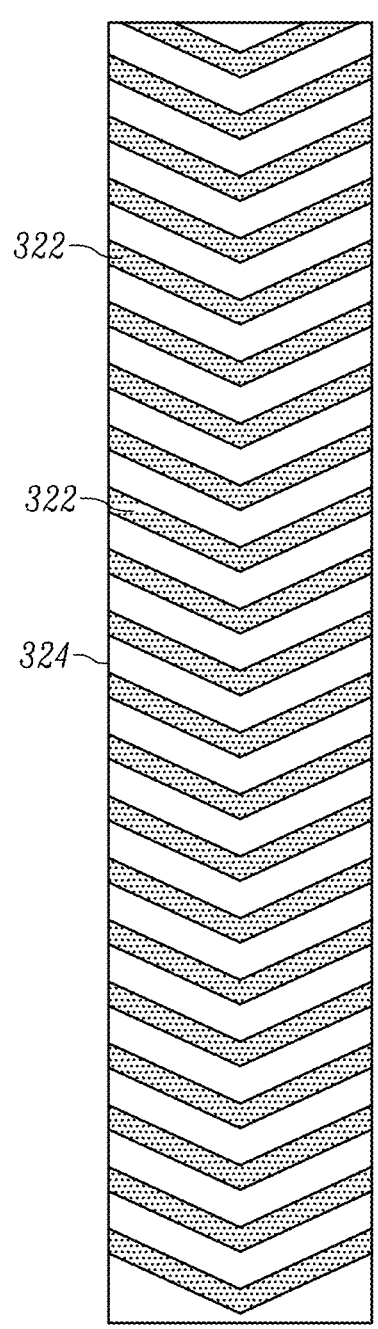

FIG. 3C depicts yet another belt engaging structure 322 which is useful for driving or being driven by so called offset tooth belts, some of which are commercially available under the name SILENTSYNC® from Continental Corporation, Fairlawn, Ohio. Offset belt engaging structure 322 is continuously disposed on the periphery of body 324. Belt engaging structure 322 includes offset rows of teeth and landing portions designed to mesh with teeth on a mating offset tooth belt. Similar to that described above, the surface of the belt engaging structure 322 may be embossed with a suitable textile reinforcement material.

Figure 3D:
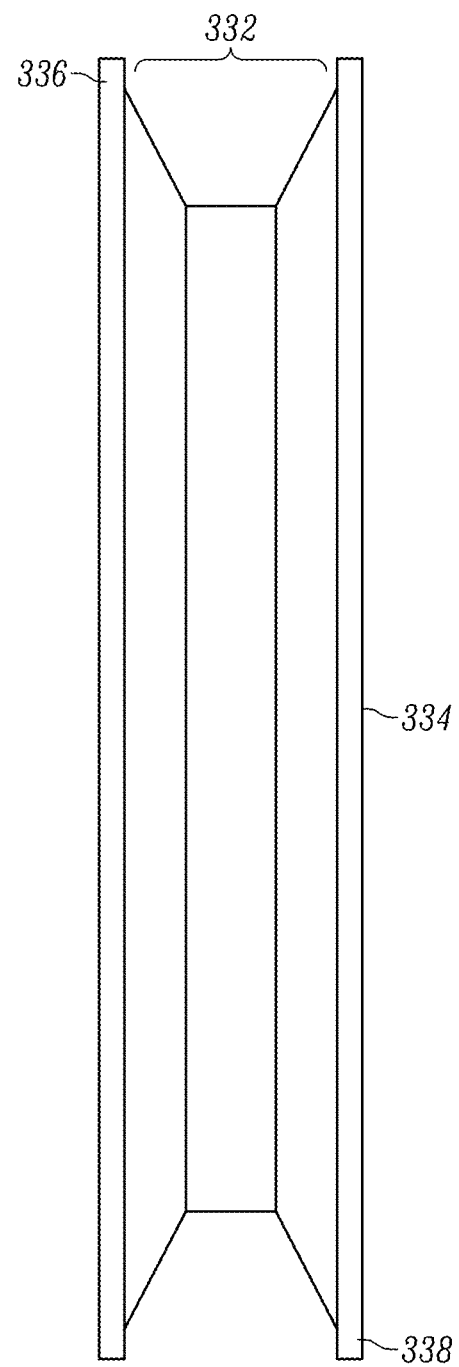

FIG. 3D shows a belt engaging structure 332, which engages a v-belt, continuously disposed on the periphery of body 334, and which is shown positioned between opposing and optional flanges 336 and 338. Here also, the surface of the belt engaging structure 332 may be embossed with a suitable textile reinforcement material.

When using non-metal, composite, sprockets one method of attaching the sprocket to a shaft is to use a bushing. QD type bushings are well suited for used with non-metal sprockets due to the flange design. It is quite noticeable that standard bushings made of metal are much heavier than the composite sprockets, even when the sprocket material volume is much greater than the bushing material. Using a non-metal bushing provides light weight drive sprockets having a corresponding light weight mounting system.

Figure 4:
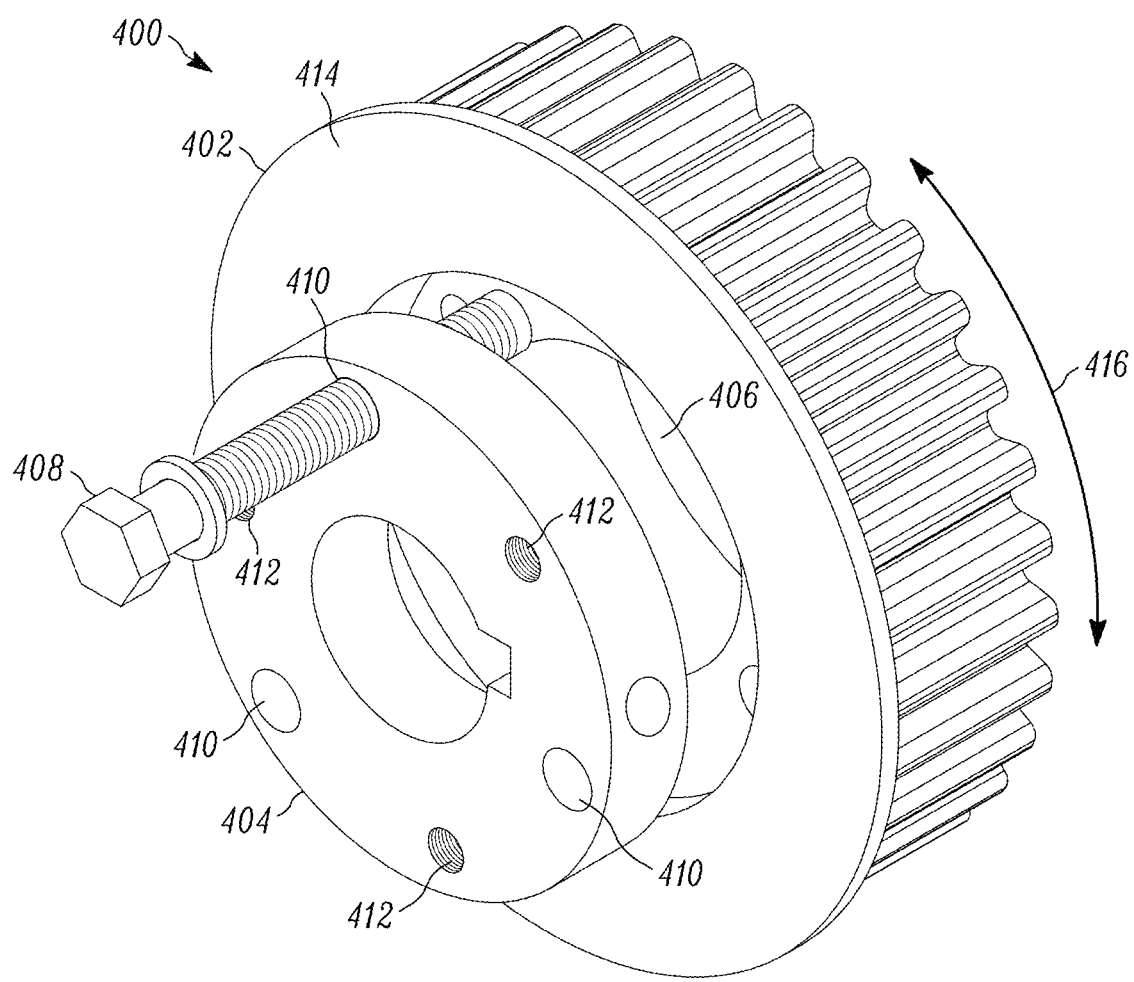
FIG. 4 depicts a high torque sprocket and non-metal QD bushing assembly in a perspective view, according to an embodiment of the disclosure; and, FIG. 5 illustrates a non-metal QD bushing in a perspective view, according to an embodiment of the disclosure.

Now referencing FIG. 4, which depicts high torque sprocket and bushing assembly 400 in a perspective view. Sprocket and bushing assembly 400 include non-metal sprocket 402 and non-metal bushing 404. While a non-metal QD bushing is shown as 404, in some other aspects a tapered bushing may be used as well. Bushing 404 may be installed into recessed hub 406 defined by the body of sprocket 402 for receiving bushing 404, and retained with any suitable fastening means, such as screws 408 (one shown) installed through ports 410 in bushing 404 which engage complimentary aligned threaded ports in the body of sprocket 402, thus securing sprocket 402 and bushing 404 with one another. Alternatively, screws 408 could be installed from an opposing side of sprocket 402 through ports therein, and screwed into threaded ports 412 of bushing 404 to secure the sprocket 402 and bushing 404.

Sprocket 402 may be of any suitable design according to the disclosure. In the embodiment shown in FIG. 4, sprocket 402 includes a body 414 defining an outer periphery and a recessed hub section 406 for engaging the bushing 404. Continuous toothed structure 416 is disposed completely around the outer periphery of the body 414. As described above, a textile reinforcement may embedded in the hub section 406 adjacent the inner surface, and/or a textile reinforcement may be embedded in the continuous toothed structure 416 outer surface. A flange 418 may be disposed on one or both sides of body 414 immediately adjacent the continuous toothed structure 416, and a textile reinforcement may in some cases, be embedded in the side surface of the flange(s).

Figure 5:
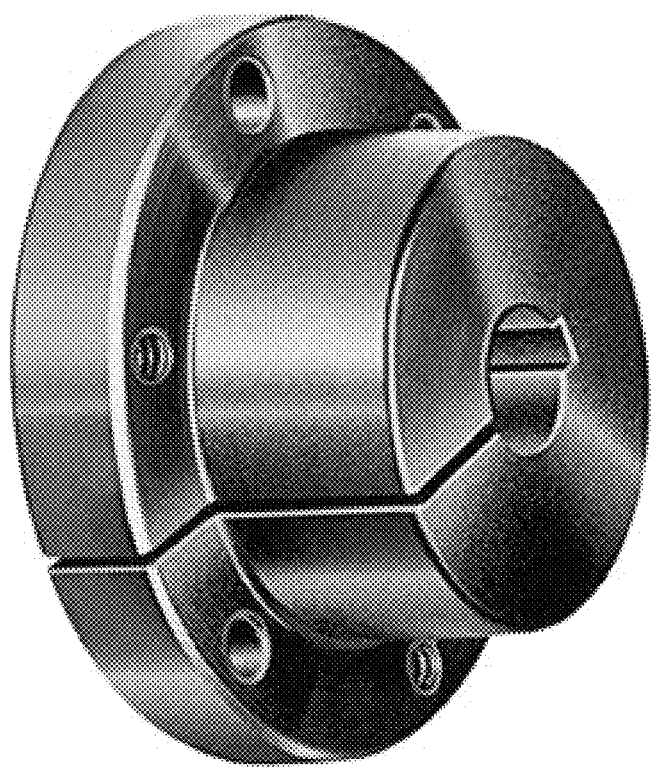

The bushing 404 may be formed from any suitable non-metal material, such as, but not limited to, a castable polymer material, similar to that described herein for sprocket embodiments. In some embodiments, bushing 404 is formed of a castable polymer material essentially free or devoid of any metal structure(s) other than metallic threaded inserts and/or metallic collars installed within ports of the bushing. Alternatively, the bushing 404 may be formed of both castable polymer material and metal components. In some aspects, bushing 404 may have textile reinforcement material(s) embedded adjacent the outer surface of the portion of bushing 404 which is installed into hub section 406. FIG. 5 shows a non-metal QD bushing, which is similar to, or like, bushing 404 shown in FIG. 4, for securing the sprocket to a shaft.

Any suitable textile reinforcement materials may be used in embodiments according to the disclosure, including, but not limited to, woven or non-woven materials, in any desirable weight and orientation, and in some cases is comprised of multiple individual plies separated by appropriate elastomeric or adhesive layers. In some other aspects, the textile reinforcement are single plies. The textile reinforcement materials may be based upon a wide variety of synthetic and natural fibers, including polyester, nylon, aramid (e.g., Kevlar), glass, polypropylene, carbon cordage, cellulose, wool, or others. The fibers may be multi-filament, monofilament, or staple fibers. In some embodiments, the textile reinforcement materials are single plies of polyester and/or nylon. The polyester can be polyethylene terephthalate or polyethylene naphthalate. In some cases the polyester can be a copolyester that contains repeat units, which are derived from both terephthalic acid and isophthalic acid or dimethyl esters thereof. In such cases, the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this disclosure may be comprised of virtually any type of nylon, such as nylon-6,6, nylon-6,12, nylon-6,10, nylon-6,9, nylon-6, nylon-11, or nylon-12. For commercial reasons, the nylon will typically be nylon-6,6 or nylon-6.

Castable materials forming the sprocket bodies and bushings according to some aspects of the disclosure include castable polymer materials, such as polyurethane polymers, polyester polymers, epoxy polymers, and the like. Polymer casting is a method of casting where a mold is filled with a liquid synthetic polymer, which then hardens. In embodiments according to the disclosure, casting may be accomplished with the liquid polymer plus an effective amount of a "hardener" liquid, which functionally contains a second polymer or reactant, for use in forming a final product which is a copolymer. Copolymers contain two different alternating chemical entities in the final polymer molecule. For example, in a polyurethane casting process, the polyurethane polymer structure may be formed by reacting a di- or polyisocyanate with a polyol. Both the isocyanates and polyols used to make polyurethanes contain on average two or more functional groups per molecule. The materials are mixed, introduced into the mold, and exposed to certain conditions (i.e. temperature, time, pressure, etc.) to form the polyurethane polymer structure or body. In some aspects, the sprocket bodies, bushings, or portions thereof, are prepared by a low pressure casting process where pressure within an empty mold is sufficiently reduced, and low pressure is used to transfer the reaction components into the empty mold, which then react and cast the sprocket or bushing body within the mold. In some other aspects, the sprockets or bushings are formed using a compression mold process which does not involve lowering pressure in the mold, but rather, high pressure is used to transfer the reaction components into the empty mold, and sufficient forces are placed on the components in the formation of the sprocket or bushing in the respective mold.

The polymeric materials used to form the sprocket and/or bushing bodies may also be mixed with various additives in conventional or suitable amounts known to persons having ordinary skill in the art. Such additives may include, and are not limited to, cross-linking agents, accelerators, retardants to prevent an unduly quick cure, antioxidants, aging resistance aids (e.g., ozone and UV resistance), adhesion promoters, processing aids, flame retardancy additives, reinforcing agents and fillers, such as carbon black, silica, other mineral fillers, lignin, fibers, friction modifiers such as UHMWPE and PTFE, and the like. In some cases, carbon black, silver salts, or any other suitable electrically conductive materials may also be added to control and/or reduce static electricity buildup. Reinforcing fillers are typically utilized at a level which is within the range of about 1 parts per hundred parts of resin (phr) to about 50 phr.

In some embodiments ultra-high molecular weight polyethylene (UHMWPE) is incorporated into the castable polymer material mixture in a suitable amount to provide increased durability to the sprocket and/or bushing. Any suitable shape of UHMWPE particles may be used, for example, powder, fibers, and the like. In cases where UHMWPE powder is used, the average size of the particles in the powder may be from about 20 microns to about 100 microns, from about 40 microns to about 80 microns, or even from about 50 microns to about 70 microns. The UHMWPE powder may be incorporated in suitable amounts, such as from about 1% to about 10% by weight of the castable polymer material, from about 2% to about 8% by weight of the castable polymer material, or even from about 3% to about 7% by weight of the castable polymer material. In any case, when the UHMWPE powder is incorporated into the castable polymer material mixture, the mixture needs to have a low enough viscosity to be processed through gear pumps on automated mixing equipment, which is typically used in the art for processing such products.

In some cases, the hardness of the final cured castable polymer material mixture including UHMWPE powder, or otherwise the produced sprocket and/or bushing, is from about 60 Shore D to about 100 Shore D hardness value, or even from about 75 Shore D to about 85 Shore D hardness value.

The advantages of embodiments according to the disclosure include a sprockets and/or bushings that are light weight and very wear resistant under high torque loads. The sprocket and/or bushing embodiments are also less costly to manufacture than existing art, and a flange or flanges can be added to the sprocket without significant additional cost. The sprocket embodiments also allow any desired cosmetic design to be easily cast into the sprocket, while creating a very accurate, strong, and wear resistant tooth and groove area. Also, the sprocket embodiments are corrosion resistant and do not require painting or other corrosion resistant finishes.

In application, embodiments of the disclosure may be useful for engaging such belts as a v-belt, poly v-belt, micro v-belt, or synchronous belt, and either driving or being driven by such belts. In other applications, the sprocket and/or bushing embodiments may also be used as a synchronous sprocket, gear sprocket, or coupling arrangement.

Embodiments according to the disclosure may be utilized over a range of suitable torque loads, both narrow and wide in scope; for example, from about 0.1 ft-lb to about 4,000 ft-lb, from about 10 ft-lb to about 1,000 ft-lb, about 150 ft-lb or greater, about 200 ft-lb or greater, about 250 ft-lb or greater, about 300 ft-lb or greater, or even about 400 ft-lb and above. Sprocket/pulley/bushing arrangement embodiments may be of any suitable diameter, such as, but not limited to from about 1 inch to about 45 inches in diameter. The width of the toothed structures may be of any suitable width, including about 0.25 inches wide to about 10 inches wide, or even from about 0.375 inches wide to about 8 inches wide. Also, the toothed structures may have any applicable tooth pitch, including, but not limited to 8 mm pitch to 14 mm pitch or any point there between.

In one testing example, a 3-D printed QD bushing was made in order to demonstrate feasibility. A QD type bushing of size SK-1½" was made with 85% fill. This non-metal QD bushing was installed onto a drive shaft, with a 34 tooth non-metal sprocket, and tested at 1750 rpm and 14.4 hp. The arrangement ran for more than 331 hrs without failure, before being removed. Although the example was made using 3-D printed materials, it is likely that many high strength non-metal materials, such as those described herein above, including but not limited, to polyurethane, nylon, HDPE and the like, could be used.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An apparatus comprising:
   high torque sprocket comprising a body defining an outer periphery and a hub section defining an inner surface for engaging a bushing, a continuous toothed structure disposed on the outer periphery of the body, and a textile reinforcement embedded in the body adjacent the inner surface of the hub section, wherein the body is formed of a castable polyurethane material, wherein the hub section inner surface is a tapered shape, and wherein the hub section inner surface is adapted to engage a conventional QD bushing; and,
   a non-metal bushing engageable by the hub section inner surface of the high torque sprocket;
   wherein the castable polyurethane material consists of a liquid which fills a mold and hardens to form the body;
   wherein the non-metal bushing is formed of a castable polymer material comprising ultra-high molecular weight powder; and,
   provided the castable polyurethane material is devoid of fibers.

2. The apparatus according to claim 1, wherein the high torque sprocket further comprises a flange disposed on a side of the body immediately adjacent the continuous toothed structure.

3. The apparatus according to claim 1, wherein the high torque sprocket further comprises a textile reinforcement embedded in a surface of the flange immediately adjacent the continuous toothed structure.

4. The apparatus according to claim 1, wherein the high torque sprocket further comprises a textile reinforcement embedded in the continuous toothed structure outer surface, and wherein the textile reinforcement is selected from nylon, cotton, aramid, PTFE, carbon cordage and mixtures thereof.

5. The apparatus according to claim 1, wherein the body is devoid of any metal structure.

6. The apparatus according to claim 5, wherein the body defines ports comprising threaded inserts disposed therein.

7. The apparatus according to claim 1, wherein the continuous toothed structure is formed of steel or the castable polyurethane material.

8. The apparatus according to claim 1, wherein the castable polyurethane material comprises ultra-high molecular weight powder in an amount of from 1% to 10% by weight of the castable polyurethane material.

9. The apparatus according to claim 1, wherein the high torque sprocket further comprises a flange disposed on a side of the body immediately adjacent the continuous toothed structure.

10. The apparatus according to claim 1, wherein the high torque sprocket further comprises a textile reinforcement embedded in a surface of the flange immediately adjacent the continuous toothed structure.

11. The apparatus according to claim 1, wherein the high torque sprocket further comprises a textile reinforcement embedded in the continuous toothed structure outer surface.

12. The apparatus according to claim 1, wherein the castable polyurethane material comprises ultra-high molecular weight powder in an amount of from 3% to 7% by weight of the castable polymer material.

13. The apparatus according to claim 12, wherein the ultra-high molecular weight powder has an average particle size of from 40 microns to 80 microns.

14. The apparatus according to claim 1, wherein the castable polyurethane material has a cured hardness of from 60 Shore D to 100 Shore D.

15. The apparatus according to claim 1, wherein the non-metal bushing is formed of a castable polymer material.

16. The apparatus according to claim 1, wherein the non-metal bushing is a QD bushing.

* * * * *